(12) United States Patent
Aldraihem

(10) Patent No.: US 8,261,492 B2
(45) Date of Patent: Sep. 11, 2012

(54) VIBRATION RESISTANT CIVIL STRUCTURE BLOCK FOR BUILDINGS

(75) Inventor: Osama J Aldraihem, Riyadh (SA)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 69 days.

(21) Appl. No.: 12/763,292

(22) Filed: Apr. 20, 2010

(65) Prior Publication Data

US 2011/0252715 A1 Oct. 20, 2011

(51) Int. Cl.
*E04H 9/00* (2006.01)
*E04H 14/00* (2006.01)
*E04H 9/02* (2006.01)

(52) U.S. Cl. .............. 52/1; 52/167.1; 264/104; 264/105

(58) Field of Classification Search ................. 52/167.1, 52/1; 264/104, 105
See application file for complete search history.

(56) References Cited

U.S. PATENT DOCUMENTS

| | | | | |
|---|---|---|---|---|
| 4,307,937 A * | 12/1981 | Gordon | ........................... | 385/39 |
| 4,849,668 A * | 7/1989 | Crawley et al. | ................ | 310/328 |
| 5,107,634 A * | 4/1992 | Onoda et al. | ......................... | 52/1 |
| 5,168,673 A * | 12/1992 | Nemir et al. | ......................... | 52/1 |
| 5,332,943 A * | 7/1994 | Bhardwaj | ..................... | 310/326 |
| 5,348,124 A * | 9/1994 | Harper | ......................... | 188/378 |
| 5,765,817 A * | 6/1998 | Breitbach | ..................... | 267/136 |
| 6,147,439 A * | 11/2000 | Takagi et al. | .................. | 310/365 |
| 7,160,607 B2 * | 1/2007 | Tanimoto | ................... | 428/297.4 |
| 2005/0062365 A1 * | 3/2005 | Tanimoto | ...................... | 310/327 |
| 2007/0108867 A1 * | 5/2007 | Saloka et al. | ................. | 310/311 |
| 2008/0136052 A1 * | 6/2008 | Pelrine et al. | ................. | 264/105 |
| 2008/0307723 A1 * | 12/2008 | Smith et al. | .................. | 52/167.8 |
| 2011/0056826 A1 * | 3/2011 | Feng | ............................ | 204/242 |

* cited by examiner

*Primary Examiner* — Mark Wendell
(74) *Attorney, Agent, or Firm* — Timberline Patent Law Group PLLC

(57) ABSTRACT

A civil structure block for buildings is provided. The civil structure block is composed of a mixture of a plurality of piezoelectric rods, a plurality of carbon fibers and cement material. The mixture imparts a vibration damping characteristic to the civil structure block.

14 Claims, 4 Drawing Sheets

VIBRATION RESISTANT CIVIL STRUCTURE BLOCK FOR BUILDINGS

FIELD OF THE INVENTION

The invention generally relates to civil structure blocks used in constructing buildings, and more specifically, to civil structure blocks having capability of damping vibration in buildings.

BACKGROUND OF THE INVENTION

In civil structures which host sensitive equipments, such as measuring and manufacturing equipments, vibration is considered to be a hazardous phenomenon. Occurrence of minimal vibration in the civil structures may hamper performance of sensitive equipments. Therefore, civil structures such as, buildings corresponding to a fabrication lab or a NANO lab, require minimization of the vibration so that the sensitive equipments are not affected.

There have been methods for constructing buildings with civil structure blocks which are vibration resistant. These civil structure blocks are manufactured by embedding viscoelastic polymers in cement material of the civil structure blocks. However, addition of a polymer material in the cement results in inclusion of a softening material. Therefore, overall strength and rigidity of the civil structure blocks is reduced.

There is therefore need of constructing a civil structure block which is capable of damping vibration in buildings. Further, there is a need of maintaining strength and rigidity of such civil structure blocks.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
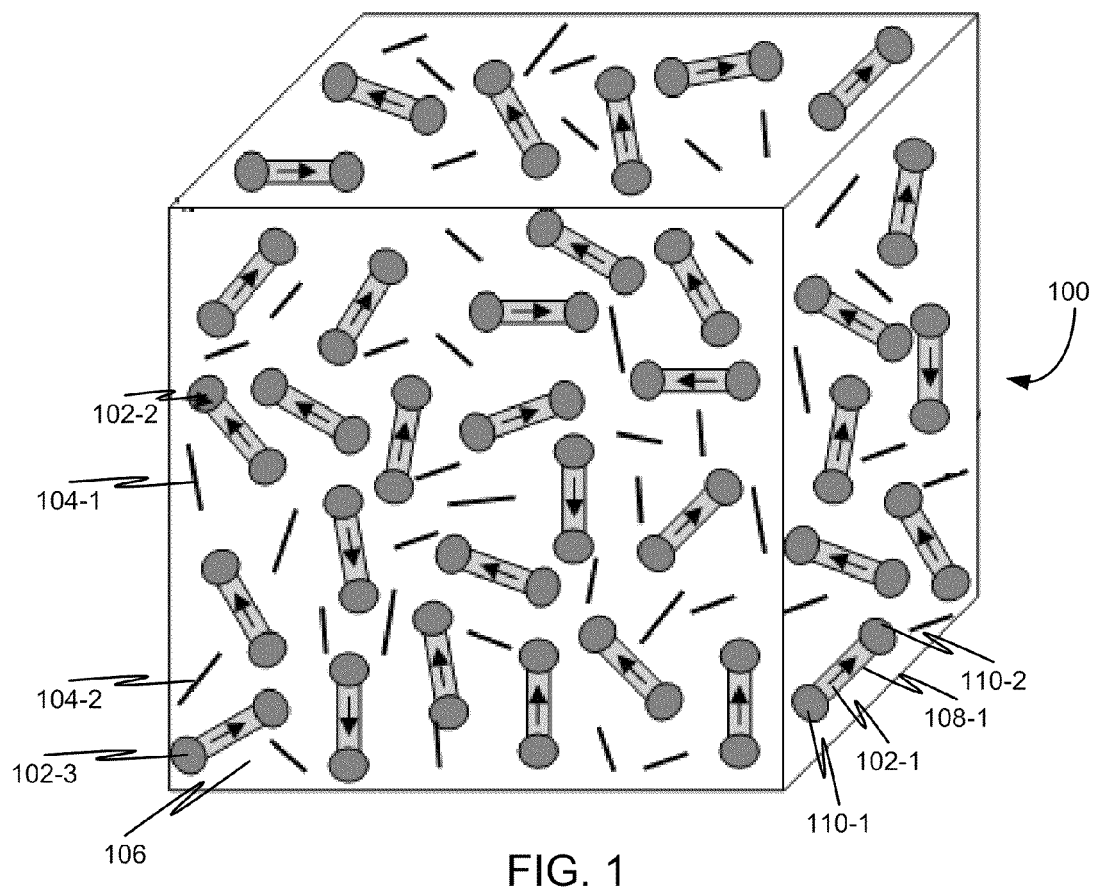
FIG. 1 illustrates a civil structure block in accordance with various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the present invention, it should be observed that the embodiments reside primarily in combinations of method steps and components related to vibration resistant civil structure block for buildings. Accordingly, the components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Generally speaking, pursuant to various embodiments, the invention provides a civil structure block for buildings. The civil structure block includes a mixture of a plurality of piezoelectric rods, a plurality of conductive fibers, and a cement material. The mixture imparts a vibration damping characteristic to the civil structure block.

FIG. 1 illustrates a civil structure block 100 in accordance with various embodiments of the invention. Examples of civil structure block 100 include, but are not limited to a brick, a foundation stone, a tile, and an aggregate element. Civil structure block 100 may be used in various civil structures such as, buildings, bridges, tunnels and so forth. Further, civil structure block 100 may be molded into various shapes such as, cuboid, I shape, round shape, and rhomboid shaped, and so forth.

Civil structure block 100 is composed of a mixture of a plurality of piezoelectric rods 102-n, a plurality of conductive fibers 104-n and a cement material 106. The mixture imparts a vibration damping characteristic to civil structure block 100.

Plurality of piezoelectric rods 102-n may be composed of piezoelectric ceramic materials such as, lead zirconate titanate (PZT) or similar materials. While including plurality of piezoelectric rods 102-n in the mixture, plurality of piezoelectric rods 102-n may be oriented in different directions with respect to civil structure block 100. Orientation of piezoelectric rods 102-n is explained in more detail in conjunction with FIG. 2A and FIG. 2B. Further, plurality of piezoelectric rods 102-n are polarized along longitudinal axis of piezoelectric rods 102-n while mixing plurality of piezoelectric rod 102-n to the mixture In an embodiment, a piezoelectric rod, such as piezoelectric rod 102-1, includes a rod 108-1. Rod 108-1 is composed of a piezoelectric material. Further, piezoelectric rod 102-1 also includes an electrode 110-1 and an electrode 110-2. Electrode 110-1 and electrode 110-2 are placed at each end of rod 108-1. In an embodiment, electrode 110-n may be composed of one of a metal material and a piezoelectric material. Further, electrode 110-n may be shaped as an oblate ellipsoid.

In another embodiment, the piezoelectric rod such as piezoelectric rod 102-1 is dumbbell shaped, such that ellipsoid ends of the dumbbell shape of the piezoelectric rods act like electrode 110-n. The dumbbell shape enables the piezoelectric rod to efficiently handle and transfer stress which may be applied due to vibration.

Plurality of piezoelectric rods 102-n included in the mixture exhibit piezoelectric property when civil structure block 100 is subjected to stress due to vibration. Based on the stress, plurality of piezoelectric rods 102-n get deformed and mechanical energy of the stress is converted into electrical charge by plurality of piezoelectric rods 102-n.

The electrical charge generated by plurality of piezoelectric rods 102-n is collected at electrodes 110-n. From electrodes 110-n, the electrical charge is passed through the mixture of plurality of conductive fibers 104-n and cement material 106. In the mixture, a conductive fiber, such as conductive fiber 104-1, is used for creating an electrical path for transferring the electrical charge generated by piezoelectric rod 102-1. The conductive fiber is composed of a conductive material such as, carbon. The electrical charge passed through the conductive fiber is dissipated as heat energy due to resistance provided by cement material 106.

Cement material 106 is a binding material for holding plurality of piezoelectric rods 102-n and plurality of conductive fibers 104-n into civil structure block 100. Further, cement material 106 provides resistance to the electrical charge flowing in plurality of conductive fibers 104-n which results in dissipation of the electrical charge into heat energy by Joule Effect.

Therefore, the mixture of plurality of piezoelectric rods 102-n, plurality of conductive fibers 104-n and cement material 106 enable dissipation of dynamic stress developed due to vibration in civil structure block 100, into heat energy. As a result, the mixture imparts a vibration damping characteristic in civil structure block 100. A level of the vibration damping characteristic is based on a ratio of plurality of piezoelectric rods 102-n, plurality of conductive fibers 104-n and cement material 106 in the mixture. As plurality of piezoelectric rods 102-n directly convert stress developed due to vibration into electrical charge, the level of vibration damping characteristic is directly proportional to a weight percentage of plurality of piezoelectric rods 102-n in the mixture. Thus, a higher weight percentage of plurality of piezoelectric rods 102-n in the mixture imparts higher level of vibration damping characteristic in civil structure block 100.

Further, the level of vibration damping characteristic is based on a resistance load of civil structure block 100. The resistance load is resistance created by cement material 106 for dissipating the electrical charge conducted by plurality of conductive fibers 104-n. The resistance load is increased by decreasing weight percentage of plurality of conductive fibers 104-n. Therefore, the resistance load is inversely proportional to the weight percentage of plurality of conductive fibers 104-n. Further, the resistance load is directly proportional to a weight percentage of cement material 106. An optimum ratio of weight percentages of plurality of conductive fibers 104-n and cement material 106 is chosen to achieve a required level of resistance load, thereby imparting a required level of vibration damping characteristic in civil structure block 100. In an embodiment, the weight percentage of plurality of conductive fibers 104-n depends on a targeted vibration frequency to be absorbed, because increasing or decreasing the weight percentage of conductive fibers 104-n may affect damping characteristics of civil structure block 100.

The level of vibration damping characteristic is also dependent on shape and size of piezoelectric rod 102-1. An aspect ratio, which is length/radius ratio of piezoelectric rod 102-1, is directly proportional to the level of vibration damping characteristic imparted to civil structure block 100. A higher aspect ratio results in higher conversion of stress (mechanical energy) developed due to vibration to electrical charge. Hence, the level of vibration damping characteristic of civil structure block 100 increases with a higher aspect ratio of piezoelectric rod 102-1. Further, the level of vibration damping characteristic may also be influenced by shape of electrodes 110-n of piezoelectric rod 102-1. Electrodes 110-n of oblate ellipsoid shape provide anchorage effect between plurality of piezoelectric rods 102-n and the mixture of plurality of conductive fibers 104-n and cement material 106, thereby improving stress transfer efficiency in the mixture. Therefore, the level of vibration damping characteristic of the civil structure block 100 is improved.

Figures 2, 2A, 2B:
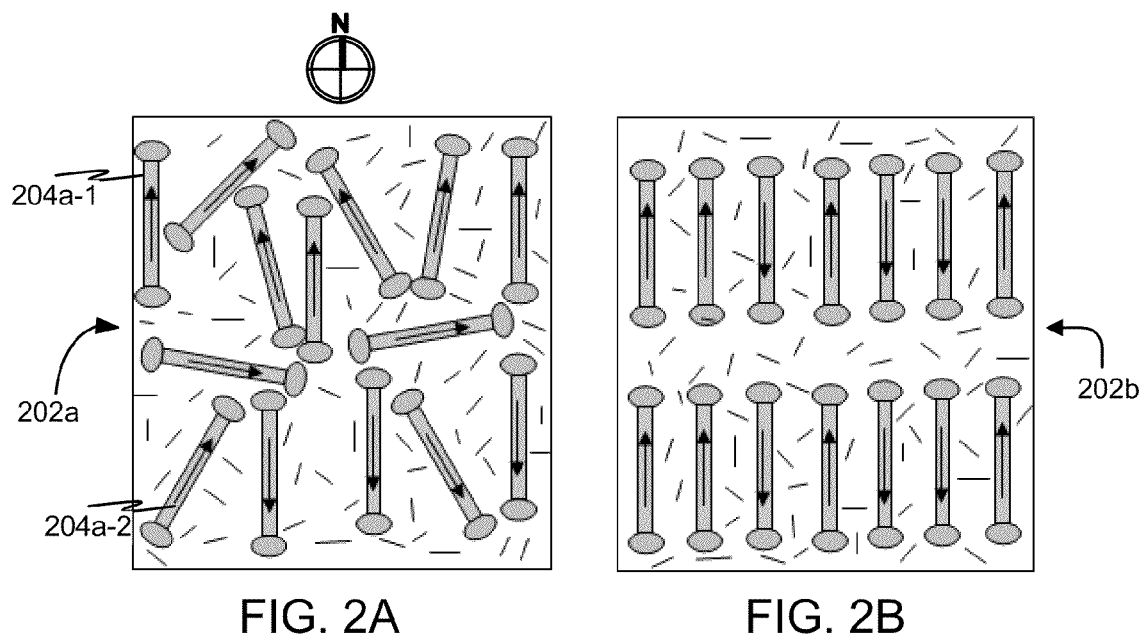
FIG. 2A illustrates orientation of a plurality of piezoelectric rods in a civil structure block in accordance with an embodiment of the invention.
FIG. 2B illustrates orientation of a plurality of piezoelectric rods in a civil structure block in accordance with an alternate embodiment of the invention.

Turning now to FIG. 2A, a civil structure block 202a is shown illustrating orientation of plurality of piezoelectric rods 204a-n in accordance with an embodiment of the invention. Plurality of piezoelectric rods 204a-n are oriented along a plurality of directions from a north-south axis of civil structure block 202a. Orientation of plurality of piezoelectric rods 204a-n in different directions provides vibration damping characteristics which are independent of direction. Therefore, the civil structure block 202a is macroscopically isotropic. Further, capability of simultaneous dissipation of shear and dilatational vibration in civil structure block 202a.

Further, in FIG. 2B a civil structure block 202b is shown illustrating orientation of plurality of piezoelectric rods 204b-n in accordance with another embodiment of the invention. Plurality of piezoelectric rods 204b-n are oriented along one preferential direction of civil structure block 202b. Therefore, the vibration damping characteristics may be increased along the preferential direction. Further, civil structure block 202b may effectively be used to mitigate vibrations along the preferential direction.

Figure 3:
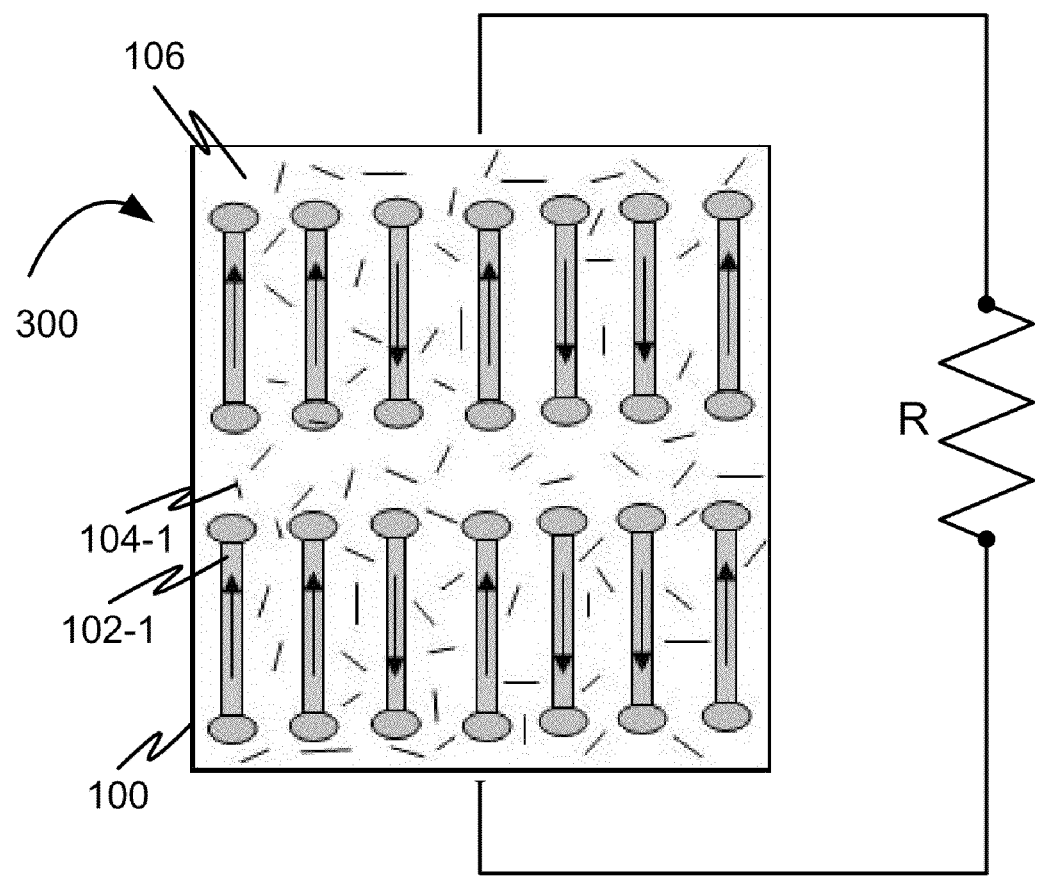
FIG. 3 illustrates a hypothetical electrical circuit for depicting vibration damping characteristic of a civil structure block in accordance with an embodiment of the invention.

FIG. 3 illustrates a hypothetical electrical circuit 300 depicting vibration damping characteristic of civil structure block 100 in accordance with an embodiment of the invention. Hypothetical electrical circuit 300 is formed between plurality of piezoelectric rods 102-n, plurality of conductive fibers 104-n and cement material 106. In hypothetical electrical circuit 300, plurality of piezoelectric rods 102-n act like a battery by producing electrical charge, plurality of conductive fibers 104-n provide a conductive path for enabling flow of electrical charge and cement material 106 provides resistance R in the conductive path.

Hypothetical electrical circuit 300 is activated when civil structure block 100 experiences vibration. Vibration results in application of stress on each piezoelectric rod of plurality of piezoelectric rods 102-n. As the stress is applied on a piezoelectric rod, such as piezoelectric rod 102-1, shape of piezoelectric rod 102-1 is deformed. Deformation of the shape results in generation of electrical charge by piezoelectric rod 102-1. The electrical charge is gathered at electrodes 110-n and then passed through one or more conductive fibers, such as conductive fiber 104-1. The one or more conductive fibers may be placed in vicinity of the piezoelectric rod. Further, cement material 106 around the piezoelectric rod and the one or more conductive fibers provides resistance to the electrical charge. Thereafter, the electrical charge is dissipated into heat energy by Joule Effect. As a result, vibration in civil structure block 100 is damped.

Therefore, activation of hypothetical electrical circuit 300 in civil structure block 100 results in imparting a vibration damping characteristic in civil structure block 100. In an embodiment, hypothetical electrical circuit 300 may be activated between a piezoelectric rod and one or more conductive fibers and cement material 106 around the piezoelectric rod. In another embodiment, hypothetical electrical circuit 300 may be activated between a set of piezoelectric rods and one or more conductive fibers and cement material 106 around the set of piezoelectric rods. Piezoelectric rods in the set of piezoelectric rods are oriented in one direction in such a scenario. Therefore, multiple hypothetical electrical circuits, such as hypothetical electrical circuit 300 may be formed in civil structure block 100, based on orientation of plurality of piezoelectric rods 102-n. The orientation of plurality of piezoelectric rods 102-n has been explained in detail in conjunction with FIG. 2A and FIG. 2B.

Figure 4:
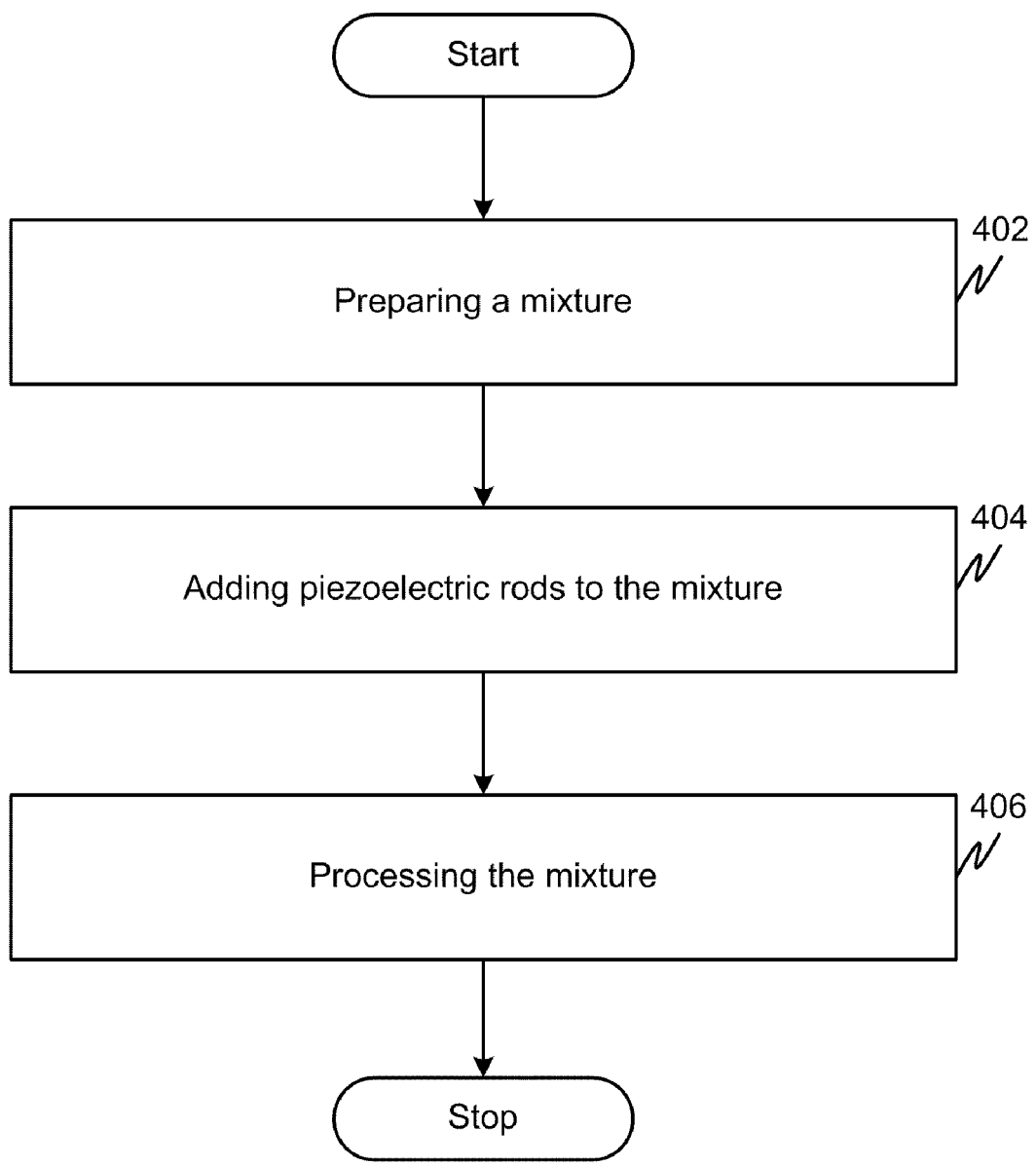
FIG. 4 illustrates a flow diagram of manufacturing a civil structure block in accordance with various embodiments of the invention.

FIG. 4 illustrates a flow diagram of manufacturing civil structure block 100 in accordance with various embodiments of the invention. At step 402, a mixture of plurality of conductive fibers 104-n, and cement material 106 is prepared. Weight percentage of plurality of conductive fibers 104-n in the mixture depends on a required level of vibration damping characteristic of civil structure block 100. Further, weight percentage of cement material 106 depends on the required level of vibration damping characteristic of civil structure block 100 and required shape and size of civil structure block 100. Thereafter, a liquid material, such as water is added to the mixture to prepare a paste of the mixture.

Upon preparation of the mixture, plurality of piezoelectric rods 102-n are added to the mixture, at step 404. Weight percentage of plurality of piezoelectric rods 102-n to be added in the mixture is based on the required level of vibration damping characteristic of civil structure block 100.

Thereafter, at step 406, the mixture is processed to form civil structure block 100. Various known processing methods may be implemented to accomplish this. For example, processing may involve pouring the mixture in a mould, and drying the mixture to form civil structure block 100.

Various embodiments of the invention provide a civil structure block for buildings which is capable of damping vibration in the buildings. The vibration damping capability is imparted by composition of the civil structure block which includes piezoelectric rods, conductive fibers, and cement material. The composition enables dissipation of mechanical stress developed due to vibration into heat energy. Further, usage of piezoelectric rods enables maintaining strength and rigidity of the civil structure block. The vibration damping characteristics of the civil structure block are not affected by variation in temperature. Moreover, as the piezoelectric rods are shaped like a dumbbell, each piezoelectric rod may effectively support the mechanical stress. Therefore, even high frequency of vibration in a building may be damped by the civil structure block. Such civil structure blocks may be used in the buildings such as fabrication labs and NANO labs which host sensitive equipments.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A civil structure block for buildings, the civil structure block comprising
    a mixture of a plurality of piezoelectric rods,
    a plurality of conductive fibers, and
    a cement material,
    whereby the mixture imparts a vibration damping characteristic to the civil structure block; and
    wherein the plurality of piezoelectric rods are aligned in a plurality of directions from a North-South axis of the civil structure block.

2. The civil structure block of claim 1, wherein the civil structure block is one of a brick, a foundation stone, a tile, and an aggregate element.

3. The civil structure block of claim 1, wherein a level of the vibration damping characteristic is based on a ratio of the plurality of piezoelectric rods, the plurality of conductive fibers, and the cement material in the mixture.

4. The civil structure block of claim 3, wherein the level of the vibration damping characteristic is directly proportional to the plurality of piezoelectric rods.

5. The civil structure block of claim 4, wherein the level of the vibration damping characteristic is directly proportional to an aspect ratio of a piezoelectric rod.

6. The civil structure block of claim 3, wherein the level of the vibration damping characteristic is based on a resistance load, wherein the resistance load in inversely proportional to the plurality of conductive fibers.

7. The civil structure block of claim 1, wherein each end of a piezoelectric rod is coupled with an electrode.

8. The civil structure block of claim 7, wherein the electrode is shaped as an oblate ellipsoid.

9. The civil structure block of claim 7, wherein the electrode comprises a piezoelectric material.

10. The civil structure block of claim 7, wherein the electrode comprises a metal material.

11. The civil structure block of claim 7, wherein a level of the vibration damping characteristic is based on shape of the electrode.

12. The civil structure block of claim 1, wherein each conductive fiber is a carbon fiber.

13. A civil structure block for buildings, the civil structure block comprising a mixture of a plurality of piezoelectric rods,
    a plurality of conductive fibers, and
    a cement material,
    whereby the mixture imparts a vibration damping characteristic to the civil structure block; and
    wherein each piezoelectric rod is polarized along a longitudinal axis of the piezoelectric rod.

14. A civil structure block for buildings, the civil structure block comprising
    a mixture of a plurality of piezoelectric rods,
    a plurality of conductive fibers, and
    a cement material,
    whereby the mixture imparts a vibration damping characteristic to the civil structure block; and
    wherein the plurality of piezoelectric rods are aligned along a preferential direction of the civil structure block.

* * * * *